United States Patent [19]

Brunet et al.

[11] Patent Number: 4,692,699
[45] Date of Patent: Sep. 8, 1987

[54] RADIAL DISPLACEMENT MAGNETIC DETECTOR DEVICE FOR A ROTOR

[75] Inventors: Maurice L. Brunet, Saint Marcel; Jean-Pierre Jolivet, Gasny, both of France

[73] Assignee: Societe Anonyme Styled: Societe Europeenne de Propulsion, Puteaux, France

[21] Appl. No.: 775,438

[22] Filed: Sep. 12, 1985

[30] Foreign Application Priority Data

Sep. 19, 1984 [FR] France ............................... 84 14374

[51] Int. Cl.⁴ .......................... G01B 7/14; G01B 7/31; F16C 41/00
[52] U.S. Cl. .................................... 324/207; 310/90.5
[58] Field of Search ............... 324/207, 208, 158 MG, 324/163, 164; 73/462; 308/10; 310/156, 166, 168; 340/682, 683, 686, 670–672; 318/659–661

[56] References Cited

U.S. PATENT DOCUMENTS

| 1,687,637 | 10/1928 | Reynders | 324/207 X |
| 2,805,677 | 9/1957 | Baird | 324/207 X |
| 4,012,083 | 3/1977 | Habermann et al. | 308/10 |
| 4,114,960 | 9/1978 | Habermann et al. | 308/10 |
| 4,285,553 | 8/1981 | Robinson | 308/10 |
| 4,470,644 | 9/1984 | Weisser | 308/10 |
| 4,473,259 | 9/1984 | Goldowsky | 308/10 |

FOREIGN PATENT DOCUMENTS

| 0124731 | 11/1984 | European Pat. Off. | 324/207 |
| 1293040 | 4/1962 | France | 324/207 |
| 0425201 | 10/1972 | U.S.S.R. | 324/208 |
| 1025997 | 6/1983 | U.S.S.R. | 324/207 |

Primary Examiner—Gerard R. Strecker
Attorney, Agent, or Firm—Weingarten, Schurgin, Gagnebin & Hayes

[57] ABSTRACT

The magnetic detection device comprises inductive elements, each one being constituted by a magnetic circuit the cross-section of which inside an axial plane is U-shaped, and a coil situated in a radial plane which constitutes a plane of symmetry for the corresponding magnetic circuit. Each of said inductive elements extends over an arc of circle of about 120° and are distributed in pairs of diametrically opposite elements. The pairs of inductive elements are angularly offset and situated in separate adjacent planes in which are situated the reference rings integral with the rotor.

10 Claims, 9 Drawing Figures

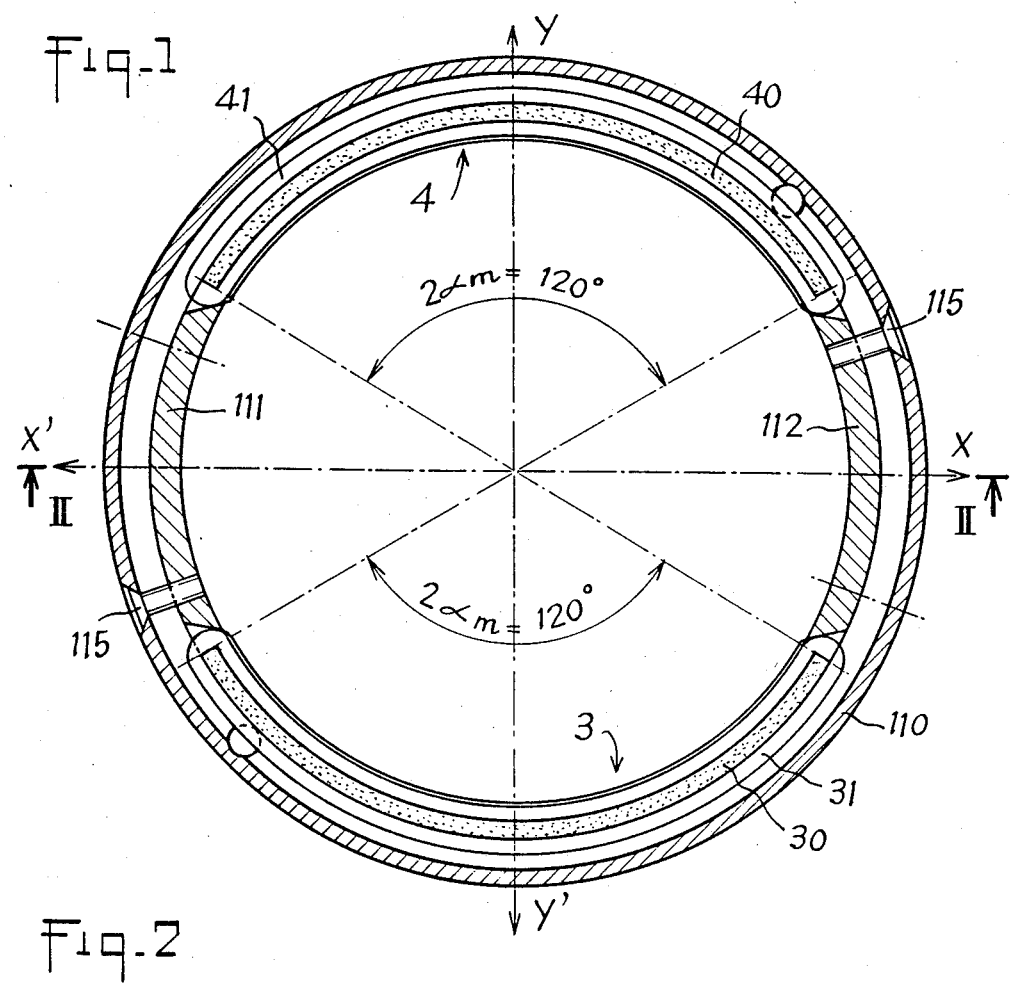

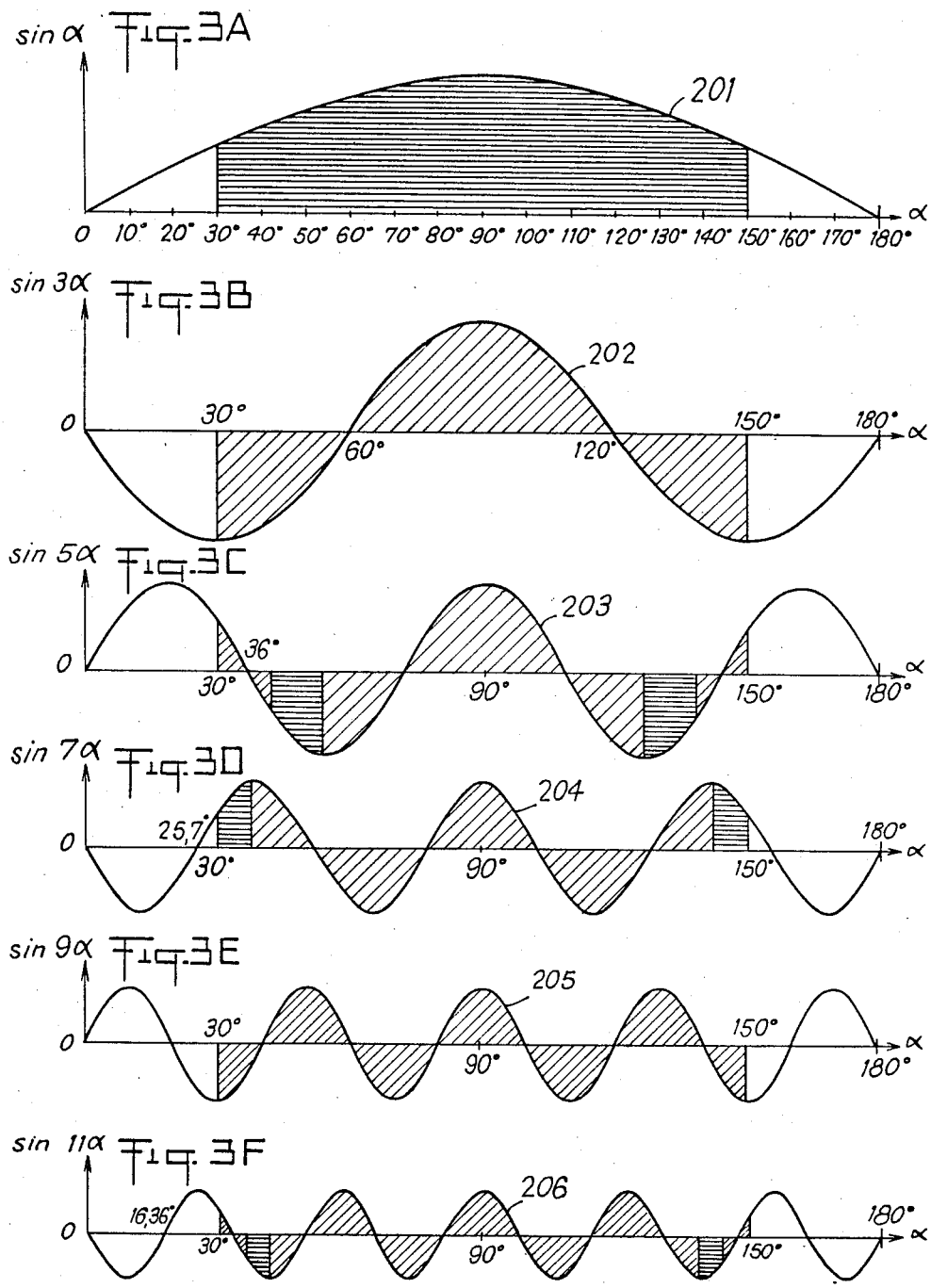

RADIAL DISPLACEMENT MAGNETIC DETECTOR DEVICE FOR A ROTOR

BACKGROUND AND FIELD OF THE INVENTION

The present invention relates to a magnetic detector device for detecting the radial displacements of a rotor mounted on active magnetic bearings, of the type comprising a plurality of inductive elements with variable air gap, which are integral with the stator on which are mounted said bearings, and at least one reference ring which is integral with the rotor and is placed in facing relation to said inductive elements to define with them the said variable air gap.

Various known detectors of the radial displacements of a rotor mounted on magnetic bearings are used for delivering electric error signals which, through a servo-control device, enable the return of the rotor to a predetermined position. The various position detectors may be of optical, capacitive or magnetic type.

One example of magnetic detector and of detection device, combining a plurality of magnetic detectors constituted by inductive elements working in cooperation with a reference ring integral with the rotor, is described in French Patent No. 2 214 890. The detection device described in said patent is solely concerned with detecting the variations of so-called reference distances which are due to a true radial displacement of the rotor axis, and with reducing the detection of the distance variations due to a variation of the radius of the reference ring of the detection device.

It is indeed extremely difficult to produce cylindrical reference rings of rigorous circularity. Now, when a detector device detects distance variations which are due to a variation of the radius of the reference ring coupled to the rotor, and do not represent a true radial displacement of the rotor, damaging vibrations may be induced in the magnetic suspension and the consumption of energy of the device receiving the output of the detector device to servocontrol the active magnetic bearing is increased. It is therefore important to have an efficient detector device with a good rate of elimination of the harmonics of the Fourier's series decomposition of the curve representing, as a function of the corresponding polar angle, the true form of the outline of the reference ring of the rotor which faces the detector device.

Although the device described in French Pat. No. 2 214 890 is a definite improvement over previously known devices, it does not, however, succeed in reducing the influence of the odd harmonics beyond the third harmonic and it requires the use of a large number of basic inductive elements with radial flux constituted by small pieces having an axial plane of symmetry and being situated inside a radial plane. These different elementary pieces may be grouped together and may be constituted by a disk composed of stacked plates and having notches in which a conductor wire is wound. However, such an embodiment is hardly suitable for detection devices designed to equip small machines requiring a detector of small diameter. The provision of small notches indeed contributes to make production very difficult, and the rate of elimination of higher harmonics remains low.

SUMMARY OF THE INVENTION

Itr is an object of the present invention to eliminate the aforesaid disadvantages and to give the possibility of readily producing a magnetic detector device which is efficient and has a high level of elimination of all harmonics due to geometrical defects in the reference ring cooperating with the detector device.

Another object of the invention is to produce a detector device which is particularly suitable for detecting radial displacements of rotors of small diameter.

These objects are reached with a detector device in which, according to the invention, each of the inductive elements comprises a magnetic circuit of which the cross-section in an axial plane is U-shaped, and a coil situated inside a radial plane which constitutes a plane of symmetry for the corresponding magnetic circuit such that each inductive element creates an axial magnetic flux in the reference ring with which it cooperates, the inductive elements being distributed in two separate adjacent radial planes, of which a first radial plane comprises a first reference ring integral with the rotor, which ring cooperates with first and second diametrically opposite inductive elements having a first axial plane of symmetry in common X'X, whereas a second radial plane comprises a second reference ring integral with the rotor, which ring cooperates with third and fourth diametrically opposite inductive element having a seond axial plane of symmetry in common Y'Y, each of said inductive elements extending over an arc of circle of about 120°.

From the combination of these characteristics, it is possible to obtain a total elimination of the third harmonic and of all harmonics multiple of three, as well as a partial although substantial elimination of the other odd harmonics, including the higher harmonics.

Moreover, since the axial flux detection elements concurring to obtain a detection in two perpendicular directions, are placed in two adjacent but separate planes, the assembling of the detector devices is a very simple operation.

The superposed first and second reference rings may be separate or they may be one single reference ring.

Advantageously, the first and second reference rings are made of ferrite, but according to another embodiment of the invention, they can be made of a material which is conducting and non-magnetic, such as for example silver, aluminium or bronze.

The magnetic circuit of inductive elements can be made of ferrite or, according to another embodiment of the invention, it can be constituted by a stack of U-shaped plates arranged in parallel to the rotor axis.

Advantageously, the inductive elements are bridge-connected and the signals supplied by two inductive elements situated in the same radial plane and diametrically opposite are algebraically substracted one from the other.

This permits a complete elimination of all the even harmonics.

The invention will be more readily understood on reading the following description with reference to the accompanying drawings in which:

BRIEF DESCRIPTION OF THE DRAWINGS

FIG. 1 is a diagrammatical crosssection, showing a pair of inductive detector elements, taken along plane I—I of FIG. 2, FIG. 2 is a diagrammatical view of an axial section taken along plane II—II of FIG. 1, showing a detector device according to the invention with two superposed detector sub-assemblies, FIGS. 3A to 3F show the form of different harmonics and the part of these signals which is eliminated by the detector device according to the invention.

DETAILED DESCRIPTION OF THE INVENTION

Figure 4:
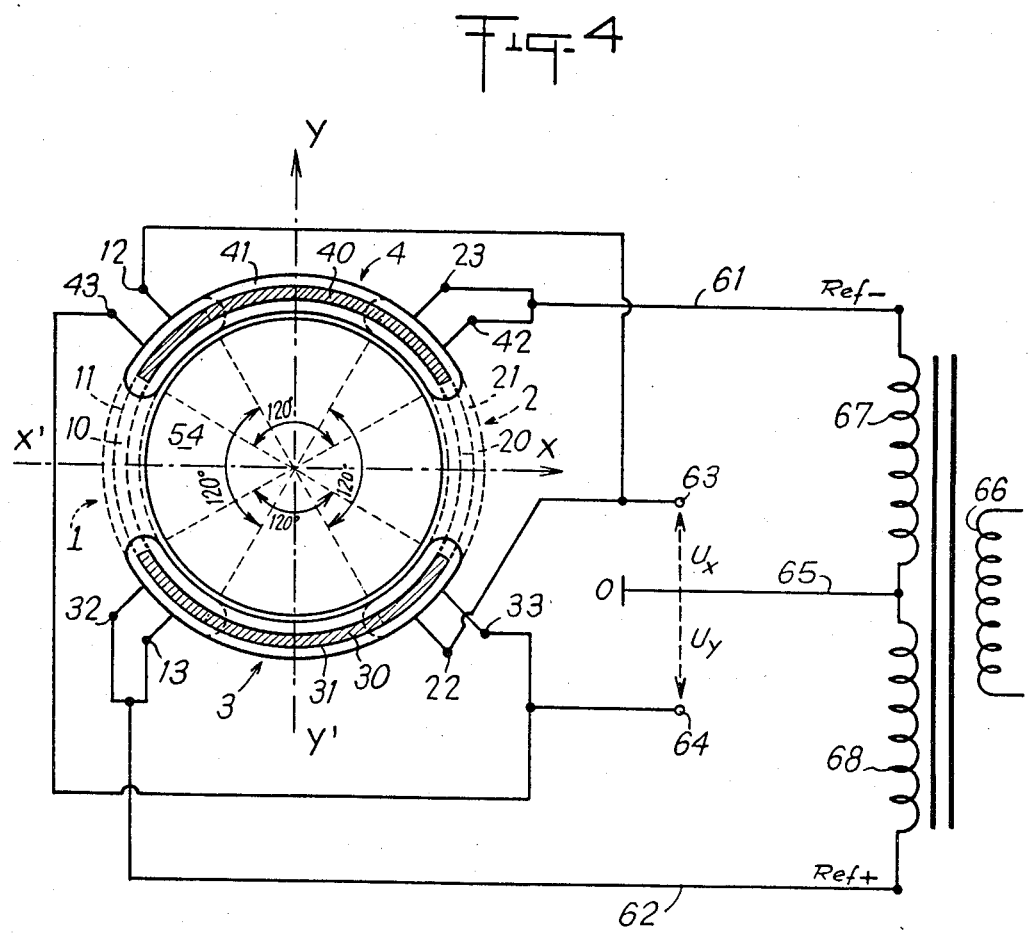
FIG. 4 is a diagrammatical representation of the association in a bridge assembly of four detector elements of a detector device according to the invention.

Referring first to FIGS. 1 and 2, these show the overall structure of a device according to the invention for detecting the radial displacements of a rotor 50 mounted contactless, with respect to a frame 100, on radial active magnetic bearings (not shown).

The detector device, which is designed to detect displacements of the rotor 90 in two radial directions X'X and Y'Y, which are perpendicular together and to the axis Z'Z of the rotor is essentially constituted of two sub-assemblies of detectors placed in two adjacent superposed radial planes $P_1$ and $P_2$. The subassembly situated in radial plane $P_1$ is designed to measure radial displacements with respect to an axis X'X whereas the sub-assembly situated in radial plane $P_2$ is designed to measure radial displacements with respect to an axis Y'Y perpendicular to axis X'X. The sub-assemblies of detection corresponding to directions X'X and Y'Y are identical but offset by 90° about axis Z'Z of the rotor.

Each sub-assembly of detection consists of two diametrically opposite detectors 1, 2 3, 4, respectively each one of which extends over an arc of circle of 120° and has a plane of symmetry constituted by the axial plane of which the trace in plane $P_1$, $P_2$, respectively is detection axis X'X, Y'Y respectively.

Each elementary detector 1, 2, 3, 4 comprises a stator magnetic circuit 10, 20, 30, 40 which is mounted inside a solid part 110 integral with the frame 100 and is U-shaped, when seen in cross-section in an axial plane (FIG. 2). A coil 11, 21, 31, 41 is wound around each stator magnetic circuit 10, 20, 30, 40, in the radial plane $P_1$, $P_2$ respectively, of the corresponding sub-assembly of detection. Plane $P_1$ thus constitutes a plane of symmetry for detectors 1 and 2, whereas plane $P_2$ constitutes a plane of symmetry for detectors 3 and 4. The two detectors arranged in arc of circle 1, 2, 3, 4 respectively of the same subassembly of detection, are held in position in grooves provided in a body 110 integral with the frame 100, said detectors being spaced out one from the other by crosspieces 111, 112 also arranged in arc of circle fashion.

Each pair of detectors 1, 2 3, 4 respectively is placed opposite a reference ring 53, 54, respectively mounted inside a piece 51 connecting it to the rotor 50, said piece 51 comprising a cylindrical part 51a holding the internal rear part of the reference rings 53, 54 and a flat annular flange 51b supporting the first reference ring 53. A covering piece 52 joined to the cylindrical part 51a of connecting piece 51 is provided for holding the second reference ring 54 in position, which second ring is superposed to the first reference ring 53. The two superposed reference rings 53, 54 could also be constituted by a single ring, the length of which in axial direction would be equal to twice the length of each individual reference ring 53, 54. Whatever the case, the open branches of magnetic circuits 10, 20, 30, 40, with U-shaped cross-section, of detectors 1 to 4 are so arranged as to end up at a short distance from reference ring 53, 54 respectively, with which they cooperate, by creating a small air gap. Detectors 1 to 4 are then so designed as to create a magnetic flux of which the field lines close up axially inside reference rings 53, 54.

Magnetic circuits 10, 20, 30, 40 of detectors 1 to 4 are advantageously made of ferrite. But they can also be constituted by an assembly of U-shaped plates, in like manner to the magnetic circuits of the stators of axial magnetic bearings.

As to reference rings 53, 54, these are preferably made of ferrite in order to obtain an accurate and homogeneous assembly. Yet they can also be made of a non-magnetic conducting material such as silver, aluminum or bronze.

Referring now the FIGS. 3A to 3F, these graphs explicate one essential advantage of the detector device according to the invention.

As indicated hereinabove, even if a reference ring 53, 54 has been produced with the greatest possible accuracy, it always shows residual irregularities, and therefore it is never rigorously circular. Variations in the radius of a reference ring 53, 54 as a function of the polar angle $\alpha$ corresponding to said radius are represented by a curve which may be considered as being the superposition of a very large number of sinusoids of periods equal to the fractions of 360° divided by the successive integers, and so corresponding to harmonics of which the frequency is a multiple of that corresponding to the rotation of the rotor. FIG. 3A shows the basic sinusoidal curve corresponding to a revolution at the speed of rotation of the rotor and FIGS. 3B to 3F show the sinusoidal curves corresponding respectively to the 3rd, 5th, 7th, 9th and 11th harmonics.

It is found that the fact of choosing an angular opening of 120° for each one of detectors 1 to 4 totally eliminates the third harmonic (FIG. 3B) and all harmonics multiple of three (FIG. 3E), since each detector 1, 2, 3, 4, by its width corresponding to a sector of 120°, covers one or more whole periods of the sine waves corresponding to these harmonics. In FIGS. 3A to 3F, the sinusoid portions not retained by the detectors are shown in oblique hachures whereas the residual sinusoid portions retained by the detectors are shown in horizontal hachures.

According to FIGS. 3C, 3D and 3F, for odd harmonics of the fifth, seventh and eleventh order, namely an order corresponding to a prime number, the fraction retained by a detector corresponds to the inverse function of the order of the harmonic, namely it is respectively equal to 1/5th, 1/7th and 1/11th. Thus, for harmonics of an order higher than 10, the residual fraction of the harmonic retained by a detector is less than 10% and goes on decreasing as the considered order of the harmonic increases. Owing to the fact that in the detection device according to the invention, each elementary detector covers an arc of 120°, it is possible to make sure that for all harmonics, after the third one at least one whole period, and after the seventh one at least two whole periods, are integrated by one elementary detector, this leading to an extremely substantial reduction of the portion of harmonic retained by the detector device, and reducing the vibrations of the magnetic suspension system as well as saving energy in the servo-control circuits.

Furthermore, all the even harmonics may be completely eliminated if a bridge assembly such as illustrated in FIG. 4 is adopted for the four detectors 1 to 4 operating their detection in the direction of axes X'X and Y'Y.

The diagram shown in FIG. 4 represents an A.C. Wheatstone bridge. Inductive elements 1 to 4 constituted by the elementary detectors described hereinabove with reference to FIGS. 1 and 2, are excited by an alternating carrier current of several scores of kHz supplied via a converter comprising a primary winding 66 and two secondary windings 67, 68 with a middle point 65. The various coils 11, 21, 31, 41 are so supplied that the signals delivered by two coils of one pair 1, 2 3, 4 respectively situated in the same plane in diametrically opposite fashion in order to detect displacements in the same direction X'X Y'Y respectively, are algebraically subtracted.

Thus according to FIG. 4, the terminals 12, 32 of coils 11 and 31 are connected to positive supply reference line 62 whereas terminals 23, 42 of coils 21 and 41 are connected to negative supply reference line 61. Terminals 12, 22 of coils 11, 21 are connected together and to output terminal 63 on which are delivered signals Ux representing the displacements along axis X'X and terminals 33, 43 of coils 3, 4 are connected together and to output terminal 64 on which are delivered signals Uy representing the displacements along axis Y'Y.

Understandably, all the even harmonics are definitely eliminated with the diagram of FIG. 4, since two diametrically opposite detectors 1, 2 or 3, 4, which are separated by an integer of periods of sinusoids of said harmonics, deliver for the said even harmonics identical signals of which the difference is necessarily nil.

In consequence, a device such as that illustrated in FIG. 4 is not only easier to produce than the prior art devices for a large number of applications, it also guarantees either a total or the very substantial elimination of all the harmonics after the second one, so that, despite the residual defects of the reference rings 53, 54, the signals delivered by the detector device represent true displacements of the rotor, and not simple periodic variations corresponding to irregularities of the rotation radius of the reference rings.

The device according to the invention is adaptable to many variants. For example, although the description is concerned with an assembly with external rotor and internal stator, the device according to the invention can also adapt to an assembly with external rotor and internal stator.

Moreover, although it is preferred to use inductive elements extending over an arc of circle of 120° and eliminating entirely all the harmonics of level three or of levels multiple of three, an approaching although slightly different value would also lead to a high rate of elimination of the higher harmonics as long as the inductive elements have an axial flux with the abovedescribed configuration.

What we claim is:

1. A radial displacement magnetic detector device for a rotor mounted relative to a stator on active magnetic bearings for rotation about an axis of rotation, comprising:

a plurality of inductive elements integral with the stator on which are mounted said bearings; and
    at least one magnetic flux conducting reference ring integral with the rotor, confronting said inductive elements and defining with said inductive elements a variable air-gap therebetween;
    said inductive elements each include a magnetic circuit element having a U-shaped cross-section viewed along the axis of rotation of the rotor and a coil adapted for connection to a source of excitation mounted to the magnetic circuit element such that the coil induces an axial magnetic flux in the confronting reference ring;
    said inductive elements being distributed in axially spaced first and second radial planes;
    said at least one magnetic flux conducting reference ring including a first magnetic flux conducting reference ring integral with said rotor in said first plane;
    said inductive elements including first and second diametrically opposite inductive elements in said first plane operatively associated with said first reference ring;
    said at least one magnetic flux conducting reference ring further including a second magnetic flux conducting reference ring integral with the rotor in said second plane;
    said inductive elements further including third and fourth diametrically opposite inductive elements in said second plane operatively associated with said second reference ring;
    each of said inductive elements extending over a circular arc of substantially 120 degrees, the coils of said inductive elements collectively providing an output indication of the radial displacement of said rotor with respect to the stator.

2. Detector device as claimed in claim 1, wherein said first and second reference rings are constituted by a single ring.

3. Detector device as claimed in claim 1, wherein said first and second reference rings are made of ferrite.

4. Detector device as claimed in claim 1, wherein said first and second reference rings are made of a conducting non-magnetic material.

5. Detector device as claimed in claim 4, wherein said conducting non-magnetic material is silver.

6. Detector device as claimed in claim 4, wherein said conducting non-magnetic material is aluminum.

7. Detector device as claimed in claim 4, wherein said conducting non-magnetic material is bronze.

8. Detector device as claimed in claim 1, wherein said inductive elements comprise a magnetic circuit element made of ferrite.

9. Detector device as claimed in claim 1, wherein said inductive elements comprise a magnetic circuit composed of a stack of U-shaped plates parallel to the rotor.

10. Detector device as claimed in claim 1, wherein said inductive elements are mounted in bridge fashion, the signals supplied by two inductive elements situated diametrically opposite inside a radial plane being algebraically deductible one from the other.

* * * * *